United States Patent [19]

Yang

[11] Patent Number: 4,689,533

[45] Date of Patent: Aug. 25, 1987

[54] CONTROLLED FAN

[76] Inventor: Tai-Her Yang, 5-1 Taipin St., Si-Hu Town, Dzan-Hwa, Taiwan

[21] Appl. No.: 791,462

[22] Filed: Oct. 25, 1985

[51] Int. Cl.[4] ............................................. H02P 1/40
[52] U.S. Cl. .................................... 318/281; 318/256; 318/283; 318/285; 318/471; 318/472
[58] Field of Search .............. 318/255, 256, 257, 280, 318/281, 283, 284, 285, 287, 288, 289, 290, 291, 293, 300, 471, 472, 473, 453; 310/62, 63; 98/40.05, 40.07; 363/141; 200/61.37

[56] References Cited

U.S. PATENT DOCUMENTS

| | | | |
|---|---|---|---|
| 2,705,911 | 4/1955 | Heiman | 310/172 X |
| 3,167,701 | 1/1965 | Lindgren | 318/282 |
| 3,295,038 | 12/1966 | Trottman | 318/281 X |
| 3,443,186 | 5/1969 | Martin | 318/282 X |
| 3,662,241 | 5/1972 | Sweger | 318/473 |
| 3,935,522 | 1/1976 | Tsay | 318/283 X |
| 4,218,898 | 8/1980 | Boyen et al. | 318/282 X |
| 4,223,256 | 9/1980 | Espenschied | 318/282 |
| 4,386,342 | 5/1983 | McKinley | 340/544 |
| 4,413,211 | 11/1983 | Flower | 318/257 |
| 4,494,055 | 1/1985 | Bitting et al. | 318/254 |

FOREIGN PATENT DOCUMENTS

| | | | |
|---|---|---|---|
| 1005858 | 2/1977 | Canada | 318/473 |
| 2547291 | 4/1977 | Fed. Rep. of Germany | 318/282 |
| 57-65283 | 4/1982 | Japan | 318/282 |
| 58-157388 | 9/1983 | Japan | 318/282 |

OTHER PUBLICATIONS

Tatung Ceiling Fan Installation Instruction, Model CDM, Tatung Company of America, Inc., Long Beach, CA 90810.

Primary Examiner—William M. Shoop, Jr.
Assistant Examiner—Bentsu Ro
Attorney, Agent, or Firm—Leonard Bloom

[57] ABSTRACT

A reversible electric motor is operatively arranged to drive an air circulating fan. Circuitry is provided to reverse the direction of rotation of electric motor periodically to provide alternating direction of air movement. Timing and reversal is provided by either a timing clock, a microprocessor, a thermal relay or a rotating disc which carries a pair of touch stops therein.

11 Claims, 24 Drawing Figures

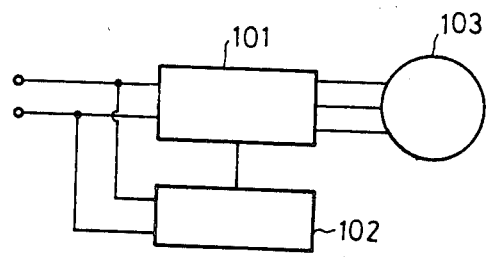
Fig. IA
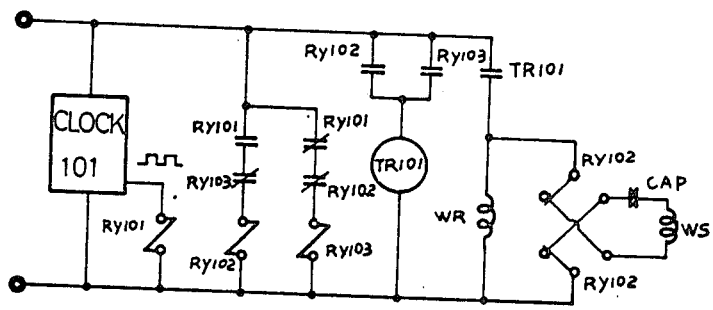
Fig. IB

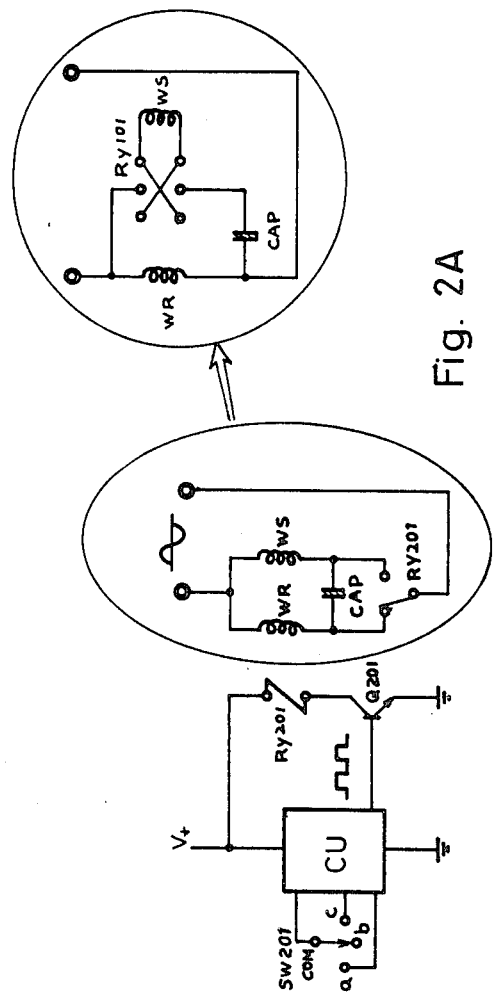
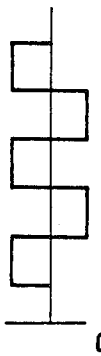
Fig. 2A
Fig. 2B

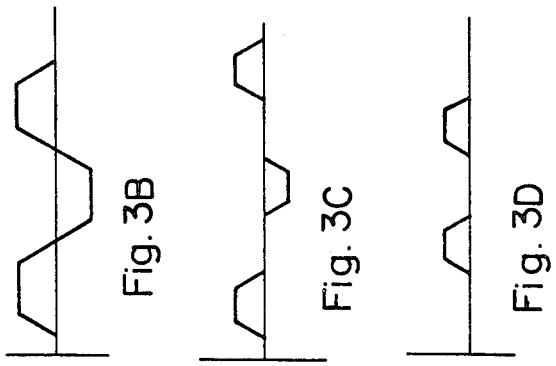
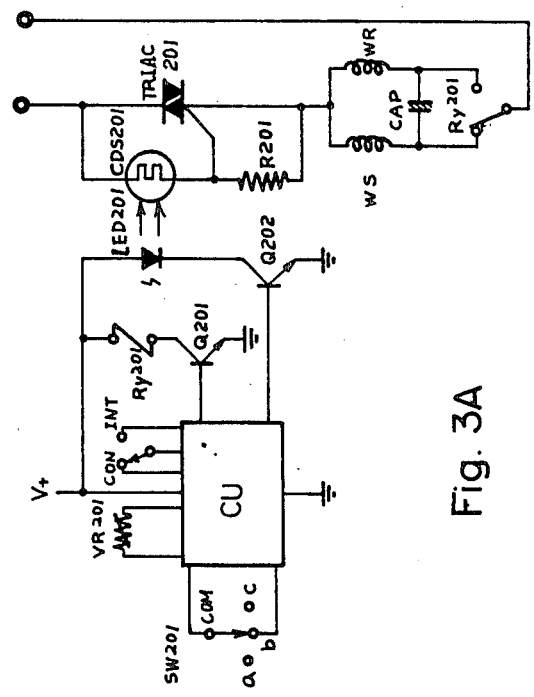
Fig. 3B
Fig. 3C
Fig. 3D
Fig. 3A

CONTROLLED FAN

BACKGROUND OF THE INVENTION

The invention relates to a fan provided with a cyclic positive and reverse switch is used to operate and control the ceiling fan or air ventilation fan or the like for the cyclic positive and reverse revolutions to achieve more complete and even air flow-stirring functions in an enclosed space, such as an air conditioned room.

SUMMARY OF THE INVENTION

The ceiling fans having the manual forward and reverse revolution functions used in the rooms often blow downwardly the cooled air flow during summer to stir and deliver the air flow with a lower temperature at a lower place to various corners in a room and blow upwardly in a reversed way during winter to make the air flow with a higher temperature at a higher place evenly dispersed in room, thereby enabling the room temperature even and constant and achieving energy-saving, but due to the limits of the construction space configurations in a room, often there are dead spaces that the air flow cannot reach. The design in this invention provides that the cyclic positive and reverse switch is used to operate and to control a ceiling fan or the like for the cyclic forward and reverse revolutions to achieve the object of more complete and even air-flow-stirring functions in an air conditioned room.

BRIEF DESCRIPTION OF THE DRAWINGS

FIG. 1A is a block diagram of an example of the fan having the forward and reverse air flow-stirring functions, in accordance with the present invention.

FIG. 1B is a schematic diagram of an example of the circuit of the example shown in FIG. 1A having the forward and reverse and intermittent drive.

FIG. 2A is a schematic diagram of a second circuit embodiment which controls the cyclic forward and reverse revolutions.

FIG. 2B is a graphic representation of the actions achieved by the circuit in FIG. 2A.

FIG. 3A is a schematic diagram of a third circuit embodiment which provides a slow reversal and change-over from forward to reverse revolutions and vice versa.

FIG. 3B is a graphic representation of the continued gradual positive and reverse revolutions achieved by the circuit shown in FIG. 3A.

FIG. 3C is a graphic representation of the intermittent positive and reverse revolutions which may be achieved by the circuit shown in FIG. 3A.

FIG. 3D is a graphic representation of the unidirectional intermittent operations which may be achieved by the circuit shown in FIG. 3A.

DETAILED DESCRIPTION OF THE PREFERRED EMBODIMENTS

Figure 4B:
FIG. 4B is a graphic representation of the continued positive and reverse actions achieved by the circuit shown in FIG. 4A.

As already known to all, the cold air current drops down and the hot air current goes up, and there is a temperature difference between a place further from the air conditioning equipment source (such as an air cooler or heater) and another place closer to the same air conditioning equipment source, to improve this defect. In recent years the people often use a ceiling fan to stir the air flow in an air conditioned room; thus, achieving the object of an even air conditioned room temperature distribution, during periods when a ceiling fan blowing downwardly is used to stir the cool air flow, and during winter, a ceiling fan blowing upward is used to blow the heated air flow up, thereby achieving the object of an even temperature distribution in a room, but due to the sharp differences in the construction spaces, it is still impossible to make the air flow in various corners evenly flow and a similar situation exists the applicatory state of the air suction/exhaust fans (see FIGS. 10-13).

The design of the invention is that a fan is provided with a cyclic forward and reverse switch which is operated to make the fan conduct the cyclic forward and reverse revolutions, thereby achieving the even air flow-stirring effects.

Since most motors of the fans are of the single-phase type, now several examples of the single-phase motors will be mainly cited. There are many circuit elements and circuits for the cyclic forward and reverse switching of the fan motors including a great variety of analogue or digital elements such as the generator or electronic elements or microprocessors provided with timing softwares, or a mechanical reduction mechanism is used to move the double stable state switch to effect the cyclic positive and reverse revolutions, so the execution means available are too numerous to mention here.

Since the object of the invention is a means that the cyclic positive and reverse switch is used to changeover the fan for the cyclic forward and reverse revolutions, in the following various examples, only several of them are cited to prove the invention feasible, as to various analogue or digital measures of a wide variety of the generator or electronic or mechanical or computer software timing will not be elaborated one by one here, because such are conventional.

FIG. 1A is a block diagram of an exemplary embodiment of the invention, in the drawing 101 is a forward and reverse switch element constituted by a solid state semi-conductor element or a relay for operation and control of the cyclic circuit, thereby making the fan motor 103 undertake the cyclic forward and reverse revolutions; 102 is a cyclic circuit constituted by an analogue or digital generator or electronic circuit or microprocessor to generate the cyclic operational signals for operating and controlling the switch element 101, its cyclic signals include the sequence changes that first provide a forward revolution direction which persists for a set period of time, then a reverse revolution instruction persists for a different period of time, and then a forward revolution instruction is generate, or a time interval of the current interruption exists between the two direction-changing instructions; 103 is constituted by a single phase AC motor or a DC motor for providing the forward and reverse revolutionary drive.

In other words, the invention can be composed of a cyclic forward or reverse air flow-stirring fan having a forward and reverse revolutionary fan, and the forward and reverse revolutions can change the blade sets and the fan motor move in the same direction, a hang device and a control device, in addition to that the selection switch is used to select the continued forward or reverse revolution, its main feature is to set the continued cyclic forward and reverse revolutions; the features of its various drive cycles are described as follows:

1. The above-noted operating cycles include the directly continued forward and reverse revolutions to change the direction of air flow in sequence;
2. The above-noted operating cycles include a slow start and a slow stop continuity to reduce the motor load; and
3. The above-noted operating cycles may include a machine stop time interval between the forward and reverse revolutions to make the air flows naturally mixed and also to reduce the motor load.

As in the example shown in FIG. 1B, the time sequence clock 101 is to generate the drive cyclic instruction, thereby making the relay RY101 effect the cyclic on and off actions, after the coil of the direction changeover relay RY102 is connected in series with the NO contact point (contacts) of the relay RY101 and with the NC contact point (contacts) of the relay RY103 and then is connected to the power supply, the coil of the auxiliary relay RY103 and the NC contact point (contacts) of the relay RY102 and the NC contact point (contacts) of relay RY101 are connected in series, the coil of the relay RY103 is also connected in parallel with the power supply. The normally open and timed contact point of the timer TR101 connected to the motor in series will close after the timer TR101 has received the electric power for some time; its start coil is subjected to the operation and double throw contact point (contacts) of the relay RY102 for the direction change-over actions, and after the timer TR101 is connected in series with the normally open contact point (contacts) of the relay RY102 and the relay RY103 in a series state, the TR101 is also connected to the power supply when and after the power supply delivers the electric current, the clock 101 will in sequence generate the drive signals to make the relay RY101 effect the cyclic ON and OFF actions, while direction relays RY102 and RY103 operated and controlled by the relay RY101 also alternately act; since the ON and OFF actions of the relay RY102 make the start winding of the motor appear in a corresponding positive or reverse revolutionary winding; since the timer TR101 is subjected to the operation of control of the contact point (contacts) of the relay RY102 and the relay RY103, this makes them all reset during the alternate changeover of the direction, which, in turn, makes the drive motors operated and controlled by the delayed contact point (contacts) have a machine stop time interval after the direction changeover action.

The above-said operating cycle also provides, if desired, that its operations have the programmable speed changes in both of the forward and reverse cycles to meet various requirements.

Figure 5B:
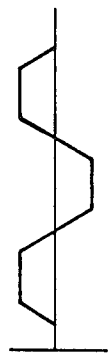
FIG. 5B is a graphic representation of the cyclic positive and reverse revolutions which are achieved by the circuit shown in FIG. 5A.
Figure 5C:
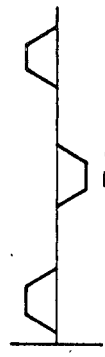
FIG. 5C is a graphic representation of the continued or intermittent operations achieved by the circuit shown in FIG. 5A.
Figure 5D:
FIG. 5D is a graphic representation of unidirectional operations which may be achieved by the circuit shown in FIG. 5A.
Figure 5A:
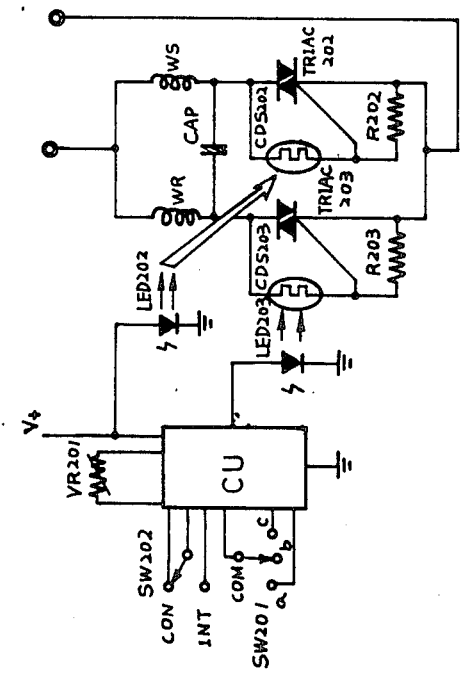
FIG. 5A is a schematic diagram of yet another circuit embodiment which uses two sets of TRIACS for the direction change-over control.

The FIGS. 2A and 5A are illustrations of examples of various mutually compatible brief and important measures and functions achieved by the invention.

FIG. 2A shows that a control unit generates a cyclic continued signal to drive a direction changeover relay RY201 to provide the motor with a direction changeover instruction, this is the simplest form to make the motor rotate in forward and reverse cyclic drive direction in a continued fashion as shown in FIG. 2B, and the single-pole, triple-throw switch SW201 is operated and selects either the continued forward revolution or continued reverse revolution.

FIG. 3A shows that a control unit operates and controls a direction changeover relay RY201 and the TRIAC 201 connected in series with theh motor windings ws, wr, and uses the LED 201 and the photosensitive resistor CDS201 coupled with the LED 201 to conduct the switch-operating actions, thereby generating the continued slow changeover as shown in FIG. 3B, or the intermittent positive and reverse revolutions as shown in FIG. 3C, or the forward or reverse electric power-saving unidirectional intermittent operations as shown in FIG. 3D, and also to still maintain the conventional continued positive revolution or continued reverse revolution, further the variable resistor VR201 conducts the relative control over the TRIAC 201 to make the fan motor change its speed, but as this kind of circuits are often seen, no detailed discussion of them is needed here.

Figure 4C:
FIG. 4C is a graphic representation of the intermittent positive and reverse operations achieved by the circuit shown in FIG. 4A.
Figure 4D:
FIG. 4D is a graphic representation of the unidirectional intermittent operations which may be achieved by the circuit shown in FIG. 4A.
Figure 4A:
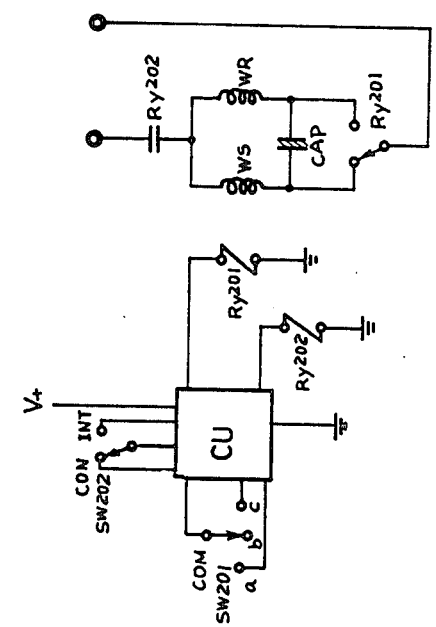
FIG. 4A is a schematic diagram of another circuit embodiment providing the switch input operating and controlling signals to operate and control the direction charge-over relay.

As shown in FIG. 4A, the operation and control of the switch SW201 are put into the control device to operate and control the direction changeover relay contact RY201 and the relay contact RY202 in series with the motor to generate the continued forward or reverse revolution as shown in FIG. 4B, or the operations of the continued and intermittent operational selection switch SW202 conduct the intermittent forward and reverse operations as shown in FIG. 4C, or the uni-directional electric-power-saving intermittent drive as shown in FIG. 4D, and also maintains the original functions of continued forward revolution or continued reverse revolution, in the drawing, when the switch SW201 is connected to the contact a the motor conducts the continued positive revolutions, when the switch SW201 is connected to the contacts b and c, the motor conducts the continued reverse revolutions. The switch SW202 is an intermittent and continued functional selection switch to select the above-noted functions as the continued or intermittent functions.

As shown in FIG. 5A, the circuit of the example in which the control device operates and controls the conduction of two sets of the TRIACS 202 and 203 providing direction selection, switching and phase control. In FIG. 5A, the setting of the switch SW201 makes the control unit respectively trigger the TRIAC 202 and the TRIAC 203 to effect the switching functions, thereby making the motor drive in either the forward revolutionary or reverse revolutionary direction, or the cyclic forward and reverse revolutions as shown in FIG. 5B, and as shown in FIG. 5C, the switch SW202 makes the selection of intermittent operation, or as shown in FIG. 5D, makes the motor effect the unidirectional intermittent electric power-saving drive. The variable resistor VR201 is for the operation of the phase-control speed changes.

Figure 6:
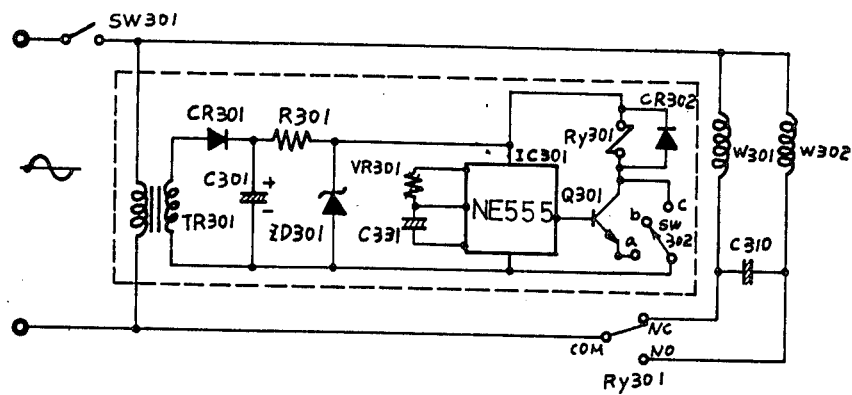
FIG. 6 is a schematic circuit diagram of a circuit which effects the cyclic revolutions and can be used as a component of the circuit in FIG. 1A.

FIG. 6 is another example similar to the block diagram shown in FIG. 1A. In FIG. 6, a switch SW301 is a master switch; in the drawing, the common connection end of the two windings W301 and W302 of the single-phase symmetric winding-type capacitance motor is connected to the switch SW301, and the other end of the windings W301 and W302 are connected in parallel to the two ends of the capacitor C310 and then respectively to the NC and NO contact points (contacts) of the forward and reverse switch element, illustrated as relay RY301, the common contact of the relay RY301 is connected to the other end of the AC power supply; the cyclic circuit includes a step-down transformer TR301 which drops the power supply which goes through a diode CR301 and filter capacitor C301 to form a DC power supply and then via the voltage dropping resistor R301 and voltage stabilizing Zener diode ZD301 to form a low voltage DC power supply.

The integrated circuit IC301 which may be a commercially available integrated timing circuit available under the designation NE555, accepts its time cycle input being regulated by an RC circuit composed of the variable resistor VR301 and the capacitor C331 to continuedly generate a cyclic signal to drive a switching transistor Q301, and the forward and reverse switch element, shown as relay coil RY301, is connected in series with transistor Q301 and is also connected in series with a diode CR302; after the relay coil RY301 and the transistor Q301 are connected in series the emitter of the transistor Q301 is connected to the contact a of the selection switch SW302 having the distribution contacts a, b and c, the contact b of the selection switch SW302 is not connected to any thing, its contact c is connected to the collector electrode of the transistor Q301, and its common pole is connected to the power supply negative end thereby forming the following three operating states:

(1) When and after the common pole of the selection switch SW302 is electrically communicative to the contact a, after the electric current is delivered therein, since the timing circuit NE555 continuedly and cyclically drives the transistor Q301 to make the relay RY301 conduct the corresponding actions, and NC and NO contacts alternately accept the electric current to make the fan motor conduct the cyclic positive and reverse revolutions;

(2) When the common pole of the selection switch is electrically communicative to the contact b, the relay RY301 will normally not accept any electric current so the motor normally is driven toward the forward direction; and (3) When the common contact point of the selection switch SW302 is electrically communicative to the contact c, the RY301 normally accepts the electric current for actions, so the motor normally is driven in the reverse direction.

In the drawing, the voltage dropping resistor R301 can accept the voltage changes of the transformer TR310 due to the regulation on the speed without affecting the specific DC voltage input.

Figure 7:
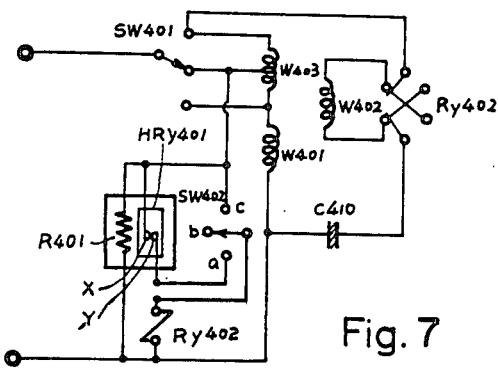
FIG. 7 is a schematic circuit diagram providing the cyclic positive and reverse revolutions using a thermal timing circuit.

FIG. 7 is similar to the block diagram as shown in FIG. 1A. In FIG. 7, the thermal cyclic relay HRY401 is a control element to effect the functions of the forward and reverse revolutionary cycles to operate the fan motor. The motor shown in FIG. 7 has a running coil W401 and a speed variation coil W403 wound co-axially with the coil W401; the speed variation coil W403 is split and drawn with proper draw chucks which is connected to the distribution contacts of the speed control switch SW401; one of its draw chucks communicates with one of the common contacts of the relay RY402. The relay RY402 is a double throw relay, and its second common contact communicates with one end of the start capacitor C410. After the two sets of NO contact points of the relay RY402 are mutually connected in a cross way and also connected to the start coil W402, the other end of the start capacitor C410 is connected to the other end of the running winding W401 and then to one end of the power supply. The contact X of the thermal relay HRY401 is connected in series with its own heating resistor R401. One end of the heating resistor R401 of the thermal relay HRY401 is connected to the distribution contact of the speed selecting switch SW401, the other end being connected to a terminal of the power supply. The selection switch 402 has three distribution contacts a, b and c of which the contact a is connected to the contact Y of the thermal switch HRY401. Another contact b is not connected to any thing; the contact c is connected to the contact X of the thermal switch HRY401, and the common contact is connected to the coil of the relay RY402 for making this circuit effect the following operations:

(1) When the selection switch is placed at the contact a of the switch SW402, the fan makes the automatic forward and reverse cyclic cycling, the process is that when the switch is at ON, since the relay HRY401 has not reached the action temperature, its normal temperature causes the contacts X and Y to close, making the coil of the relay RY402 accept the electric current which, in turn, makes the contacts of the relay RY402 active; now the motor runs in one direction when the heating resistor of the relay HRY401 continuously heats to reach the action point of the relay HRY401, the contacts X and Y trip off to make the relay RY402 interrupt the circuit which, in turn, makes its contacts also tripped off, which further makes the motor run in a reverse revolutionary state, until the relay HRY402 dissipates, restoring its original temperature, now its contacts close and the motor runs again in a forward direction of revolution, and so on;

(2) When the selection switch SW402 is placed at the contact b, the relay RY402, becomes inactive thus making the motor run in the reverse direction of revolution; and (3) When the selection switch SW402 is placed at the contact c, the relay continuously accepts the electric current and the motor runs in the forward revolutionary direction.

Figure 8:
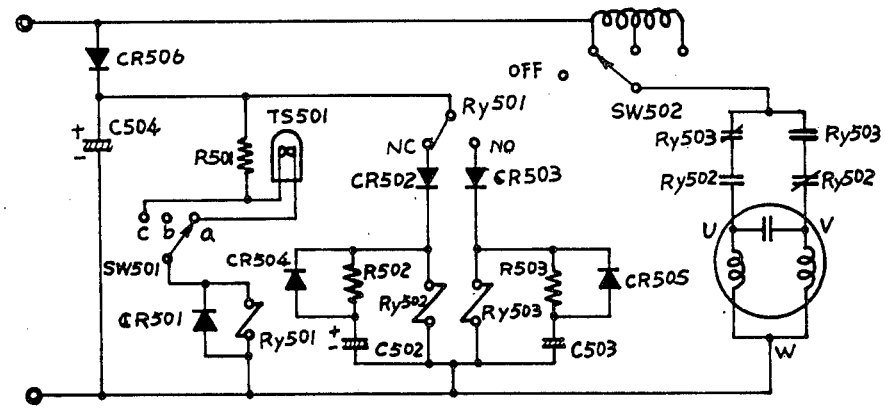
FIG. 8 is a schematic circuit diagram providing the thermo-driven cycle which achieves the intermittent positive and reverse cycling.

In FIG. 8 is another example similar to the block diagram shown in FIG. 1A. Its main components include a single phase motor having a running winding, a start winding and a split phase capacitor, of which the circuit point W is a common point, the circuit point U is a forward revolutionary input point, the NC contacts of serial relay RY503 and the NO contacts of the relay RY502 are then connected to the speed change switch. The circuit point V is the input point of the reserve direction of revolution, the NC contacts the serial relay RY502 and the NO contacts of the relay RY503 are then connected to the speed change switch SW502. A diode CR506 and the capacitor C504 constitute a direct current power supply. The two ends of the temperature switch TS501 are respectively connected to the contacts a and c of the switch SW501. A resistor R501 is connected to the positive electrode of the power supply and to the contact c of the switch SW501. The common circuit point (pole) of the single-pole distribution switch SW501 is connected to the coil of the relay RY501 and then to the negative terminal of the power supply. A diode CR501 having a fly wheel effect is connected in series to one end of the coil of the relay RY501. The common contact of the relay RY501 leads to the positive power supply, its NC contacts are connected in series via diode CR502 and the coil of the relay RY502 to the lead of the negative power supply. A resistor R502 and a capacitor C502 form a charging delay circuit, which is connected in series with the two ends of the coil of the relay RY502. The coil is connected in series to one end of the resistor R502 and then forms, with the capacitor C502, the discharge circuit limited by the fixed resistor R502. The NO contacts of the relay RY501 are connected in series to a diode CR503 and to the coil of the relay RY503 leading to the negative. A fixed resistor R503 and a capacitor C503 form a charge delay circuit which is connected in series to the relay coil RY503.

The operation of the circuit of FIG. 8 is best understood by reading the three following paragraphs. When the switch SW501 is placed at the contact a, and while the temperature switch TS501 is heated by the resistor R501 but has not reached the action point, the relay RY501 responds and the power supply current goes through the NO contacts of the relay RY501 and also, via the diode CR503 and the relay RY502, to make the coil of the relay RY503 respond, enabling the motor to run in a reverse direction of revolution. The electric current flows through the resistor RY503 to charge the capacitor C503. When the temperature switch TS501 is heated sufficiently to act, the relay RY501 cuts off the electric current supply, its NC contacts accept the electric current, the electric current flows through the diode CR502 and also, via the coil of the relay RY502 to the negative. The electric current flows through the resistor R502 and changes the capacitor C502, the relay RY502 accepts the electric current, and the electric current for the motor which originally flowed through the relay RY503 is cut off, but now the capacitor C503 causes the relay RY503 to accept the electric current via the diode CR505 to make the resistor R503 still receive electric current for a period of time. This in turn, causes the electric current not go to the forward revolution circuit point U via the contacts of the relay RY502, until the capacitor C503 discharges to the effect that the relay RY503 is released. When and after the temperature sensor TS501 is cooled off and restored to its original position, the relay RY501 is electrically conductive and its NO contacts accept the electric current. The current flows through the diode CR503 and also, via the coil of the relay RY503 to the negative. The electric current flows through the resistor R503 and charges the capacitor C503, the relay RY503 also accepting the electric current. The relay electric energy originally flowing through the relay RY502 to the motor is cut off; however, the capacitor C502 causes the relay RY502 still accept electric current via the diode CR504 to maintain a period of time, thus causing the electric current not to flow to the reverse revolutionary circuit point V via the contacts of the relay RY503, until the capacitor C502 discharges to the effect that the relay RY502 is released. These actions are repeated over and over again, thereby forming the forward and reverse cyclic rotations with the electric stop interval therebetween. This is a first mode of three possible modes of operation.

When the switch SW501 is changed to the contact b, the relay RY501 does not accept the electric current, the circuit point U now accepts the electric current, and the motor is placed in a continuous forward revolution moade.

When the switch SW501 is changed to the contact c, the relay RY501 accepts the electric current, the circuit point V now accepts the electric current, and the motor is placed in a continuous reverse revolution mode.

The circuit of the present invention can be achieved using a control device having the programmed microprocessor. The circuit thus formed includes a microprocessor having an input end to accept control signals to effect the start, stop, etc. and also a forward revolutionary output and the reverse revolutionary output to operate and control a switch element which may be made from solid state components or conventional circuit components. Forward and reverse revolutionary control signals with changes of the cyclic signal values may control the switch element.

Also to the switch elements and the interface circuits which may be used to accept the operation and control of the microprocessor, one can use the examples shown in FIGS. 2A and 5A.

Figure 9:
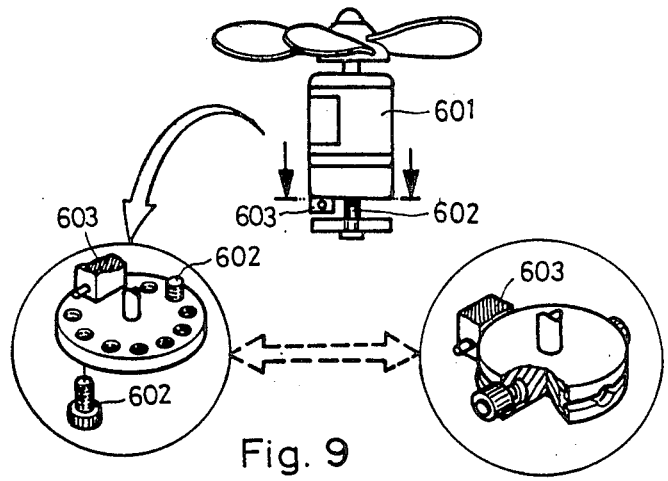
FIG. 9 is an illustration of the mechanical operating and controlling circuit combined with a double state switch.
Figure 11:
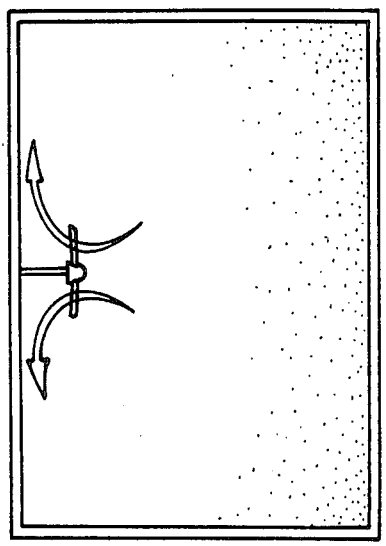
FIGS. 10 and 11 are illustrations of the indoor air state distribution showing only exhaust functions.
Figure 10:
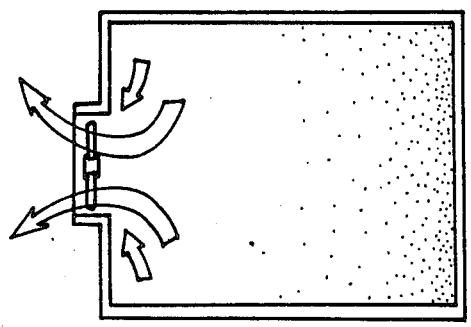
Figure 13:
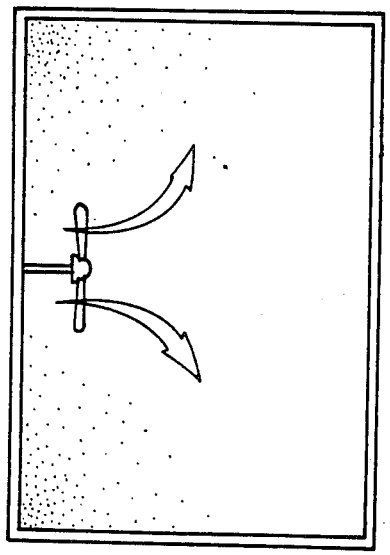
FIGS. 12 and 13 are illustrations of the indoor air state distribution showing only suction functions.
Figure 12:
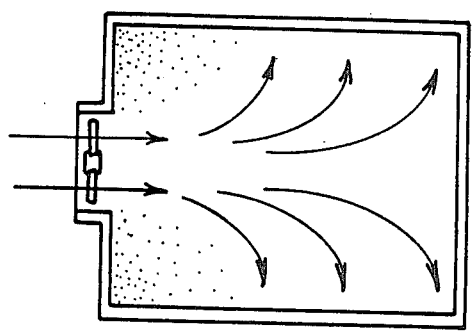

The above mentioned practical applications of the invention can also be separated and controlled for implementation by the poking type forward and reverse revolutionary signal generator device of the reduction type, adjustable forward and reverse drive transmission elements as shown in FIG. 9 may be used. AS illustrated in FIG. 9, a reduction transmission element set is driven by the motor 601 to drive into motion the rotary disc having plural sets of the annularly arrayed threaded holes for setting the slidably adjustable touch stop thereon. The motor could be arranged to drive a rotary disc having a drum-shaped part with an annular T-shaped slot therein. As shown in FIG. 9, each of the touch stop dogs 602 are driven via the disc by the low speed shaft of the reduction transmission element to alternately touch and contact the double stable state switch 603 during the respective forward and reverse revolutionary movements so as to change the rotary direction of the motor. The double stable state switch 603 accepts the poking of the touch stop dogs 602 so as to change over its contacts and thus to change over the motor from one wiring state into another wiring state so as to change its rotary direction. The drive motor 601 has the forward and reverse revolutionary winding draw chucks to accept the poking actions of a double stable state switch for the forward and reverse revolution modes.

In other words, after the drive motor 601 starts to run, the reduction transmission element coupled to its motor shaft can be the fixed speed ratio of the transmission type of the gear belt frictional wheel or the adjustable speed ratio, its final output drives the two touch stops 602 into motion to respectively poke the double stable state switch 603 at the termination of each cycle of the forward and reverse revolutionary direction to change the rotary direction of the motor which, in turn, changes the direction of the driven air flow, the space between the touch stops 602 used by the poking switch 603 can be fixed or adjustable to change the cycle time periods accordingly.

Summing all the above up, the aim and good of the present invention is to specially design air flow-stirring fans, such as the ceiling fans or ventilators, to provide cyclic forward and reverse revolutions, thereby enhancing the evenness of the temperature in a room and eliminating the dead spaces as well as raising the flow circulation an exchange effects of the air fans. The novelty of this concept is apparent and the means are practicable, so undoubtedly this is a design with a high practicality.

What is claimed is:

1. A poking-type forward and reverse revolutionary motion device comprising:
   a reversible drive motor;
   a reduction transmission coupled to the drive motor and including a low speed output shaft;
   a rotary disc having a plurality of annularly arrayed threaded holes therein, said disc being coupled to said low speed output shaft;
   a pair of thread-bearing touch stops removably positioned in two of said annularly arrayed threaded holes;
   a double stable state switch fixedly positioned with respect to said rotary disc, having touch responsive actuator means thereon responsive alternatingly to contact with responsive ones of said pair of touch stops and including motor reversing switch means providing alternatingly forward and reverse current to said reversible drive motor in response to alternating contact with said respective ones of said pair of touch stops; and
   wherein said rotary disc is a drum shaped disc with an annular T-shaped slot therein for adjustably setting the pair of touch stops thereon.

2. The device set forth in the claim 1, wherein said reduction transmission is a transmission having an adjustable speed ratio.

3. The device set forth in claim 1, wherein said reduction transmission is a transmission having a fixed speed ratio.

4. The claim device set forth in claim 1, wherein distance between the touch stops can be adjustable to change periods of forward and reverse operation.

5. The device according to claim 1, further including a fan, said fan being coupled to said reversible drive motor.

6. In a system for moving air within a space, a fan having a plurality of blades mounted for rotation about an axis; a reversible motor having a first winding and second winding; and automatic control means for causing said motor to rotate about said axis in one direction for first predetermined periods and in a second opposite direction for second predetermined periods, and wherein said automatic control means comprises:
   a time sequence clock;
   a first relay having a coil, a pair of normally open contacts and a pair of normally closed contacts;
   a change-over relay having a coil, a pair of normally open contacts;
   a double-pole, double-throw switch responsive to current flow in the coil of the change-over relay, the switch being in one position when current flows in the coil of the change-over relay and being in a second polarity reversing position in the absence of current flow in the coil of the change-over relay;
   an auxiliary relay having a coil, a pair of normally closed contacts and a pair of normally open contacts;
   a timer operatively arranged to close a pair of contacts for allowing current to flow to the first and second windings of the reversible motor;
   wherein the coil of the first relay is connected to the time sequence clock and responsive to output therefrom;
   wherein the normally open contacts of the first relay and the normally closed contacts of the auxiliary relay are connected in series with one another and with the coil of the change-over relay;
   wherein the normally closed contacts of the first relay and the normally closed contacts of the change-over relay are connected in series with one another and with the coil of the auxiliary relay;
   wherein the normally open contacts of the change-over relay and the normally closed contacts of the auxiliary relay are connected in parallel with one another and in series with the timer to supply power thereto; and
   wherein the normally open contacts of the timer are connected in series with the first winding of the reversible motor, and via the double-pole, double-throw switch, with the second winding of the reversible motor.

7. The system according to claim 6, including automatic means for bringing said motor slowly up to and slowly down from its maximum speed when a change in rotational direction is being undertaken.

8. In a system for moving air within a space, a fan having a plurality of blades mounted for rotation about an axis; a reversible motor having a first winding and a second winding; and automatic control means for causing said motor to rotate about said axis in one direction for first predetermined periods and in a second opposite direction for second predetermined periods, and wherein said automatic means comprises:
   a timer having an output signal terminal;
   a relay having a coil, a common contact, a normally open contact and a normally closed contact;
   a transistor having its collector-emitter path connected in series with the coil of the relay, its base being connected to the output of the timer; and
   a single-pole, triple-throw switch, in one position the switch providing a short circuit between the collector and emitter of the transistor whereby current will flow continuously through the coil of the relay holding the normally open contact in current-carrying contact with the common contact thereby supplying current to the first motor winding causing the motor to rotate in one direction, in a second position the switch allowing the transistor to turn ON and OFF in response to output from timer causing current to flow on an interrupted basis through the coil thereby alternatingly bringing the common contact into alternating contact with the normally open and normally closed contacts thereby alternatingly supplying current to the first and to the second motor windings causing the motor to rotate first in one direction and then the opposite direction, and wherein in a third position of the switch, the transistor is OFF and no current flows in the coil of the relay, allowing the normally closed contact to remain in contact with the common contact thereby supplying current to the second motor winding causing the motor to rotate in the opposite direction.

9. The system according to claim 8, including automatic means for bringing said motor slowly up to and slowly down from its maximum speed when a change in rotational direction is being undertaken.

10. In a system for moving air within a space, a fan having a plurality of blades mounted for rotation about an axis; a reversible motor having a first winding and a second winding; and automatic control means for causing said motor to rotate about said axis in one direction for first predetermined periods and in a second opposite direction for second predetermined periods, and wherein the first winding of the motor is composed of two parts, one of these parts having three contacts terminals thereon, a three-position of switch having a single pole which can be selectively brought into contact with one of the contact terminals at a time, the second part of the first winding being connected in series with the first part, and wherein said automatic control means comprises:

a thermal relay having a coil and a pair of contacts;

a double-pole, double-throw switch connected across the second winding of the motor, one pole of the switch being connected to one of the contact terminals of the first winding and the other pole being connected to a circuit point to which one end of the coil of the relay is connected, the double-pole, double-throw switch being in one position when current flows in the coil of the relay supplying current to the second winding of the motor to effect rotation of the reversible motor in one direction and being in a second position when current does not flow in the coil of the relay, supplying reverse current to the second winding of the motor to effect rotation in an opposite direction;

a heating resistance connected between one end of the coil of the relay and the second contact terminal of the first winding of the motor, the heating resistance being positioned in close vicinity to the contacts of the thermal relay;

a second three-position, single-pole switch having its common pole connected to the other end of the coil of the relay not coupled to the double-pole, double-throw switch; and wherein in one position of the second single-pole switch is conductively connected to one contact terminal of the first winding; a second position is open and a third position is conductively connected to one of the contact of the thermal relay.

11. The system according to claim 10, including automatic means for bringing said motor slowly up to and slowly down from its maximum speed when a change in rotational direction is being undertaken.

* * * * *